United States Patent
Karmann

(10) Patent No.: US 12,513,802 B2
(45) Date of Patent: Dec. 30, 2025

(54) METHOD FOR ADAPTING LIGHTING, AND SYSTEM FOR ADAPTING LIGHTING

(71) Applicant: AUDI AG, Ingolstadt (DE)

(72) Inventor: Jürgen Karmann, Ehekirchen (DE)

(73) Assignee: AUDI AG, Ingolstadt (DE)

(*) Notice: Subject to any disclaimer, the term of this patent is extended or adjusted under 35 U.S.C. 154(b) by 24 days.

(21) Appl. No.: 18/685,025

(22) PCT Filed: Aug. 8, 2022

(86) PCT No.: PCT/EP2022/072263
§ 371 (c)(1),
(2) Date: Feb. 20, 2024

(87) PCT Pub. No.: WO2023/025581
PCT Pub. Date: Mar. 2, 2023

(65) Prior Publication Data
US 2024/0349410 A1 Oct. 17, 2024

(30) Foreign Application Priority Data
Aug. 23, 2021 (DE) .................. 10 2021 121 776.8

(51) Int. Cl.
*B60Q 3/70* (2017.01)
*H05B 47/105* (2020.01)

(52) U.S. Cl.
CPC ............ *H05B 47/105* (2020.01); *B60Q 3/70* (2017.02)

(58) Field of Classification Search
CPC ................................ H05B 47/105; B60Q 3/70
See application file for complete search history.

(56) References Cited

U.S. PATENT DOCUMENTS

| 2005/0134475 A1* | 6/2005 | Reim ............ B60Q 1/326 |
| | | 340/815.45 |
| 2018/0086259 A1* | 3/2018 | Bel ............ B60Q 3/16 |

FOREIGN PATENT DOCUMENTS

| DE | 10 2005 041 261 A1 | 3/2006 | |
| DE | 102013011188 A1 * | 2/2014 | ............ B60Q 3/80 |
| DE | 10 2014 019 158 A1 | 4/2016 | |
| DE | 10 2017 131 029 A1 | 6/2018 | |
| DE | 10 2017 128 896 A1 | 6/2019 | |
| DE | 10 2019 001 332 A1 | 7/2019 | |
| DE | 10 2020 002 832 A1 | 8/2020 | |
| DE | 10 2019 121 019 A1 | 2/2021 | |

(Continued)

OTHER PUBLICATIONS

Machine Translation of DE-102013011188-A1. (Year: 2014).*
(Continued)

*Primary Examiner* — Alexander H. Taningco
*Assistant Examiner* — Pedro C Fernandez
(74) *Attorney, Agent, or Firm* — STAAS & HALSEY LLP

(57) ABSTRACT

The examples may relate to a method of adapting lighting of at least one lighting module of a motor vehicle to sounds which are generated and output by a sound system of the motor vehicle. In an example, the sounds may be associated at least one image which is automatically represented by the at least one lighting module at least in a section and in a manner temporally correlated with the output sounds. In an example, the at least one image may be read in by a selection module. A system to configure lighting may include a data processing unit, a lighting module and a selection module.

17 Claims, 2 Drawing Sheets

(56) References Cited

FOREIGN PATENT DOCUMENTS

| | | |
|---|---|---|
| EP | 1 544 036 A2 | 6/2005 |
| EP | 3 300 953 A1 | 4/2018 |
| JP | 09-073274 | 3/1997 |

OTHER PUBLICATIONS

International Search Report issued in International Application No. PCT/EP2022/072263 dated Nov. 30, 2022.
Notification of Transmittal of English Translation (Form PCT/IB/338) issued in International Application No. PCT/EP2022/072263. dated Feb. 29, 2024.
English Translation (PCT/IB/338 of Feb. 29, 2024) of International Preliminary Report of Patentability (Form PCT/IPEA/409) issued in International Application No. PCT/EP2022/072263 dated Jun. 9, 2023.

* cited by examiner

METHOD FOR ADAPTING LIGHTING, AND SYSTEM FOR ADAPTING LIGHTING

CROSS-REFERENCE TO RELATED APPLICATIONS

This application is a U.S. national stage of International Application No. PCT/EP2022/072263, filed on Aug. 8, 2022, which claims the priority benefit of German Patent Application No. 10 2021 121 776.8 filed on Aug. 23, 2021. Both the International Application and the German Patent Application are incorporated by reference herein in their entirety.

BACKGROUND

1. Field

Examples of the invention may relate to a method of configuring lighting and to a system to configure lighting. Lighting of a passenger compartment of a motor vehicle is able to be configured individually by a driver.

2. Description of the Related Art

Document DE 10 2017 131 029 A1 describes a controller for controlling a sound output for a vehicle.

A lighting arrangement for motor vehicle ambient lighting is known from document DE 10 2019 121 019 A1.

A controller for a lighting device is described in document DE 10 2020 002 832 A1.

Document DE 10 2005 041 261 A1 describes a greeting system for greeting a user of a motor vehicle.

A method for controlling an air-conditioning device of a motor vehicle, an air-conditioning device and a motor vehicle are known from document DE 10 2014 019 158 B3.

SUMMARY

Against this background, according to an aspect of the examples, lighting of a passenger compartment of a motor vehicle may be configured.

The examples may be achieved by way of a method and a system having the features of the independent patent claims. Other features of the method and of the system may become apparent from the dependent patent claims and the description.

The method according to the examples is intended to configure lighting of at least one lighting module of a motor vehicle to sounds that are generated by a sound system, generally by at least one loudspeaker of the motor vehicle, and emitted or output in a passenger compartment of the motor vehicle, the sounds having associated with them at least one image or photo, possibly also a sequence of multiple images, as an optical identification feature that is depicted or displayed automatically and dynamically at least in sections by the at least one lighting module, taking into consideration the sounds, and is usually emitted in the passenger compartment in a manner temporally correlated with the output sounds. In this case, it is possible for a display of the at least one image depicted at least in sections to be varied, this also being possible depending on a sequence of the sounds. The at least one image is read in by a selection module.

In an example, the at least one image may be animated and depicted dynamically by the at least one lighting module based on at least one acoustic parameter, for example a frequency and/or volume, that is to say an amplitude or a level, of the sounds. In this case, a depiction, for example a color and/or brightness, of the at least one image is adapted automatically and/or dynamically, wherein this depiction is correlated with the at least one acoustic parameter. The at least one image, that is to say the at least one section of the at least one image, is optically varied or changed automatically and/or dynamically depending on the acoustic sounds, that is to say depending on the acoustic parameters.

It is possible for the at least one image, as the at least one optical identification feature, to be represented or depicted on a sleeve for an audio medium that comprises the sounds. The audio medium, for example a CD or compact disc or a record (LP), comprises or stores the sounds. Generally speaking, the at least one image is associated with an audio source that comprises the sounds or from which the sounds are output. In this case, it is possible for the audio source to be configured as an audio medium. An audio source may also be configured as an audio file or sound file. It is thus possible for the at least one image also to be associated with the audio file or sound file, for example a music file and/or an audiobook. Such an audio file is present for example in the MP3 format. It is possible for the audio file and the at least one image associated with the audio file to be stored in a database in the form of a tuple and to be retrieved from the database via a live stream and thus via real-time transmission, wherein the sounds in the audio file are emitted and played back in the passenger compartment, wherein the image associated with the audio file is depicted in sections depending on the sequence of the sounds and with a dynamic range of the sounds or in accordance with a dynamic range of the sounds.

The at least one image may be used to represent or depict at least one creator, for example at least one musician, who produced the sounds.

It is possible for the sounds to comprise music, voices and/or noise. The sounds furthermore have a specific artistic, for example musical, style and/or a rhythm as additional acoustic parameters to which the depiction of the at least one image is adapted automatically and/or dynamically.

It is furthermore possible, at one time, to depict in each case at least one excerpt of the at least one image, in an example in each case only a single excerpt, wherein it is possible for the at least one excerpt or a corresponding section of the image to be configured as or referred to as a line, for example row or column, of the image. In this case, it is possible for multiple, generally different sections of the at least one image to be depicted in succession, for example in rows or in columns. In this case, the at least one section is selected using a selection module. The selection module is designed to scan or to read in the image, including in sections. In this case, it is possible for the selection module to be moved relative to the image, wherein the selection module and/or the movement thereof are or is controlled by the data processing unit. In this case, in each case a section of the image is selected and read in by the selection module. In the event of such a movement, the image is scanned in dynamically in sections by the selection module and a respectively scanned-in section is depicted using the lighting module. However, it is also possible for the at least one image to be depicted in each case completely and in the process for example dynamically animated and/or optically changed, wherein the image is adapted automatically and/or dynamically to the sounds and depicted in a manner adapted accordingly. In an example, the at least one image is depicted in lines, wherein the sequence of successively depicted lines, for example rows or columns, is associated with the sequence of the sounds.

The system according to the examples may be to configure lighting of at least one lighting module of a motor vehicle to sounds that are generated by a sound system, generally by at least one loudspeaker, of the motor vehicle, wherein the sound system is configured to emit or output the sounds in a passenger compartment of the motor vehicle and in the process to play back the sounds. The system has a data processing unit, the sounds having associated with them at least one image, for example a sequence of multiple images, as an optical identification feature. The data processing unit is configured to actuate the at least one lighting module as standard and to initiate a depiction of the at least one image by the at least one lighting module automatically and/or dynamically depending on the sounds. This takes place in particular in a manner temporally and/or dynamically correlated with the output, for example played-back, sounds.

The system furthermore has an optical selection module, for example a camera, which may also be configured as or referred to as a scanner and is configured to read in or scan in the image at least in sections or continuously section by section. In this case, it is possible for in each case only one section of the image ever to be captured by the selection module. The selection module is furthermore moved relative to the image at a settable speed, this accordingly being determined in sections and dynamically, wherein the image is depicted continuously and dynamically in sections by the at least one lighting module. It is also possible for the image to be depicted dynamically depending on the settable or set speed of the selection module relative to sections, for example rows or columns, of the image, wherein this speed may be varied in some examples.

The data processing unit is configured to adopt the at least one image from a database as a possible further component of the system and/or to scan it in at least in sections via a sensor-based and/or optical scanner of the system. This is also possible while the sounds are being generated.

The at least one lighting module is configured as a display or display panel, for example of the sound system, and/or as passenger compartment lighting, for example as at least one lighting element, of the motor vehicle. The at least one lighting module has for example multiple light-emitting diodes (LEDs) that provide lighting in different colors, for example even simultaneously.

The sound system has a rendering device for the sounds, for example a playback device for an audio medium, for example a CD, and/or an audio source, wherein the sound system may be configured as a component of the system. In this case, it is possible for the rendering device also to be configured for example as a computer program by way of which the audio source is loaded from a database, for example via the Internet, and the sounds are played back as a live stream or real-time transmission. The at least one lighting module may likewise be configured as a component of the system.

The method and the system make it possible to configure both passenger compartment lighting and exterior lighting of the motor vehicle comprising the at least one lighting module dynamically to information that is depicted in the image or by the image, wherein such a configuration is dependent on the information in the image. In this case, it is also possible to dynamically configure a color of the lighting module to the sounds. It is thus possible, inter alia, to light the passenger compartment of the motor vehicle dynamically and in the process to provide an association with respective sounds currently being listened to, for example with respective music currently being listened to. This thus comprises an association between light that is provided by the at least one lighting module and the sounds being listened to, usually the music being listened to, wherein occupants of the motor vehicle are provided with and/or have conveyed to them a connection between music being listened to and displayed lighting. It is possible in this case for the at least one lighting module to be configured as part of the passenger compartment lighting, for example as a lamp, or of the exterior lighting, for example as a headlight, of the motor vehicle. It is also possible for the at least one lighting module to be configured as part of an instrument cluster in the passenger compartment of the motor vehicle.

In an example, it is possible to depict the at least one image of an audio source on which sounds, for example music, are stored in a display or display panel of the at least one lighting module depending on the sounds. This concerns for example at least one image on a cover or a sleeve of an audio medium, for example a CD or record, wherein the sounds are kept, for example stored, mechanically or digitally on this audio medium.

It is also possible for at least one audio file and the at least one image to be stored in a database in the form of a tuple, wherein the at least one audio file comprises the sounds, wherein the at least one image is associated with the at least one audio file within the database. In this case, it is also possible for the cover or the sleeve of the CD matching a track, for example song, respectively being played and/or composer to be read for example in rows by the selection module and to be depicted depending on the sounds by an interior communication light (ICL) as the at least one lighting module, for example display. In this case, the light emitted by the at least one lighting module is associated with the music usually played by the sound system. If the sounds are provided by a radio or a radio station, it is possible for a logo and/or symbol of this radio station to be used as the at least one image, this being a radio station that is received terrestrially or through radio waves or digitally. It is also possible for the at least one audio file and the at least one image associated definitively with the audio file to be provided via a playlist, for example as a function on demand. The at least one image may for example also depict or display sung and/or spoken text in the sounds, for example the music and/or an audiobook or audio drama, wherein it is possible to depict respectively a sung and/or spoken line of text synchronously in the at least one for example linear lighting module. Generally speaking, any image, for example including a piece of art, may be associated with the sounds, wherein it is possible for such an image to be produced or created or provided individually by a user of the method and of the system.

Reading or scanning of information in the image using the selection module may be carried out in different variants. In this case, it is possible for the image or the information therein to be read in each case in sections by the selection module, for example at different angles, in alternating directions and/or at alternating speeds. It is thus possible, when listening to the music multiple times, to introduce a larger variety for the lighting. It is possible here to adapt the speed at which the at least one image is read or scanned dynamically to a tempo and/or a rhythm of the sounds, in particular of the music. It is also possible for an image to be read in completely by the selection module within a definable or settable time interval, for example of one minute, and depicted or displayed synchronously accordingly by the at least one lighting module.

It is also possible to use for example any personal photo as the image, this being depicted automatically and dynamically at least in sections by the at least one lighting module depending on the sounds respectively being played. Such an image or photo may also be a private recording.

Multiple lighting modules may also be used in the passenger compartment of the motor vehicle in the method, wherein it is possible to depict the image with full lighting of the passenger compartment of the motor vehicle depending on the sounds.

An occupant of the vehicle as client is thus able to dynamically experience a combination of sounds, for example music, and a colorful configuration of lighting in the passenger compartment and even configure this themselves.

In an example, it is possible inter alia to control colors that are depicted by the at least one lighting module depending on sounds, wherein information in the image is depicted as a media object, for example a graphic for a CD album.

The at least one lighting module by way of which the at least one image is depicted automatically and/or dynamically depending on the sounds is for example of linear, slit-shaped, rectangular and/or elongate and accordingly has a linear, slit-shaped, rectangular and/or elongate display panel or display. In this case, in an example, it has at least one row of light-emitting diodes that are arranged linearly next to one another. In an example, this may be just one row or multiple rows of light-emitting diodes. Such a linear lighting module may be configured for example as part or as a component of a multifunction instrument of the motor vehicle and is integrated into same.

The selection module for capturing and/or scanning the image that is depicted automatically and/or dynamically at least in sections as an accompaniment to the sounds may for example be configured as and/or referred to as a camera, wherein the selection module, for example the camera, has a linear, slit-shaped, rectangular and/or elongate capture field by way of which it is possible to capture, for example read in or scan, the image in lines, for example in rows or in columns.

It is possible for the display panel of the at least one for example linear lighting module and the capture field of the selection module to have the same proportions. In this case, it is possible for the section of the at least one image as read in and/or selected by the selection module to be depicted true-to-scale by the at least one lighting module.

It goes without saying that the features mentioned above and those still to be explained below may be used not only in the respectively indicated combination but also in other combinations or on their own without departing from the scope of the examples of the present invention.

BRIEF DESCRIPTION OF THE DRAWINGS

The examples are illustrated schematically in the drawing and are described schematically and in detail with reference to the drawing.

DESCRIPTION

The figures are described in conjunction with one another and in general terms. The same reference signs are assigned to the same components.

Figure 1:
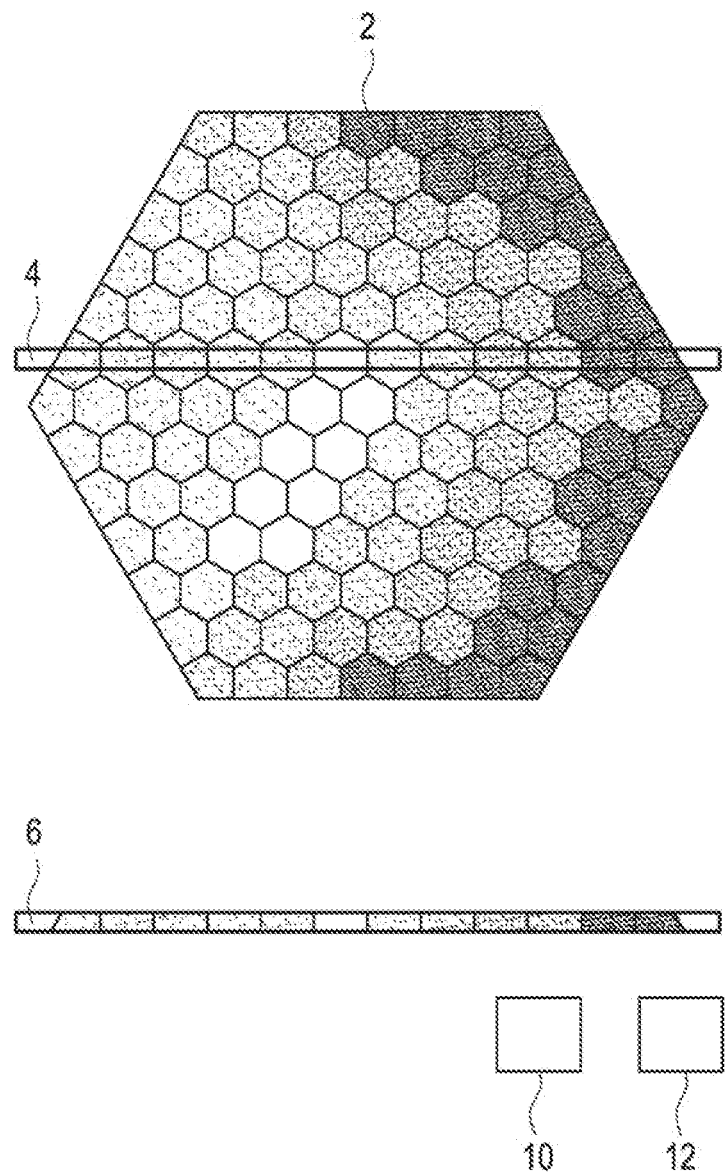
FIG. 1 schematically illustrates details of the system when performing a first example of a method according to the described examples.

In an example, the system illustrated schematically in FIG. 1 is configured for a motor vehicle that has at least one lighting module 6 that is configured to light a passenger compartment of the motor vehicle. The motor vehicle furthermore has a sound system 10 comprising at least one loudspeaker that is configured to emit sounds and thus also music in the passenger compartment of the motor vehicle.

The lighting module 6, which is rectangular and linear here, and the sound system 10, which are illustrated only schematically here, are at the same time also configured as components of the system. Said system also comprises a data processing unit 12, for example a computer processor, as further component. An additional component of the system may be configured as a selection module 4, here as an optical scanner, and is illustrated in each case schematically in FIGS. 1 and 2. This selection module 4 here is likewise of rectangular and linear design and may have the same proportions as the lighting module 6. The lighting module 6 may be configured here as a component of a multifunction instrument of the motor vehicle that is integrated into a dashboard.

In an example of the method, lighting of the lighting module 6 is adapted to sounds, for example to music, that are generated and/or played by the sound system 10. Provision is made here for the sounds that are played to have associated with the sounds an image 2, illustrated schematically in FIGS. 1 and 2. This image 2 is depicted automatically and/or dynamically at least in sections by the lighting module 6 while the sounds are being played back by the sound system 10, wherein the image 2 depicted at least in sections in this case optically accompanies and/or accentuates the sounds from the sound system 10.

Figure 2:
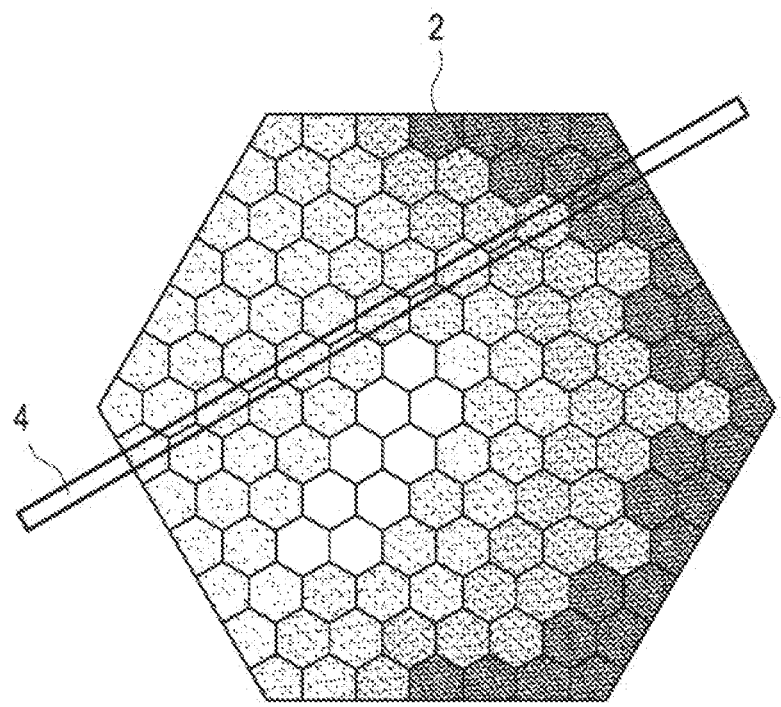
FIG. 2 schematically illustrates details from FIG. 1 when performing a second example of the method according to the described examples.

Provision is made here for the image 2 to be associated with the sounds, for example with the music, and/or to represent the sounds, wherein it may be possible for the image 2 to depict a sleeve or a cover of a CD. An example of image 2 is depicted in FIGS. 1 and 2 using multiple pixels that are arranged in rows and in columns in the image 2, wherein each pixel here by way of example depicts a color of a color spectrum. Although the image 2 is hexagonal here, it may also have other shapes, and be, inter alia, quadrilateral, for example rectangular, in particular square.

In an example of the method, the selection module 4 is moved relative to the image 2, wherein the selection module 4 is for this purpose controlled by the data processing unit 12. In this case, at one time, in each case only an elongate, linear and/or slit-shaped section or excerpt of the image 2 is captured by the selection module 4. Furthermore, any pixels within a row and/or column of the image 2 that are selected and/or captured by the selection module 4 at the time may be depicted synchronously on the lighting module 6.

Figures 3A, 3B, 3C:
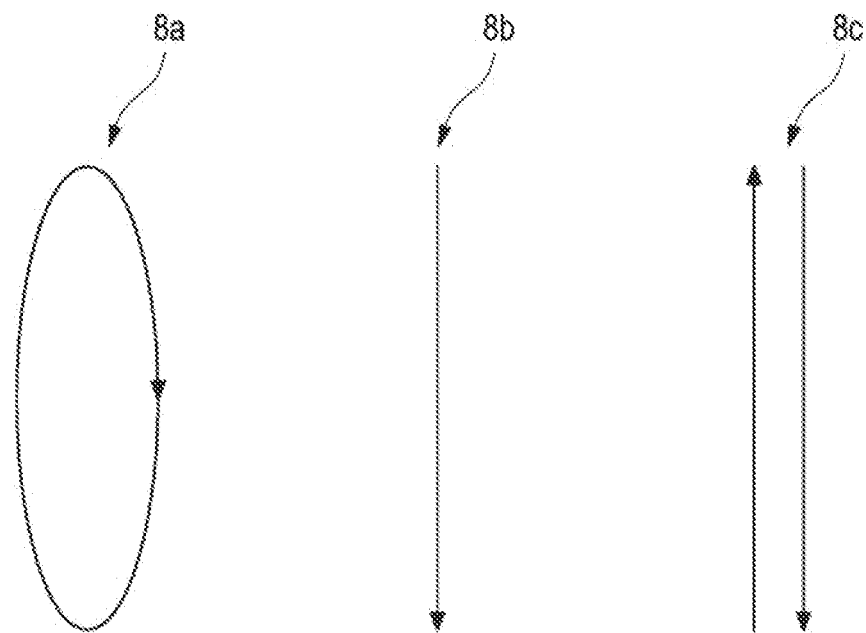
FIGS. 3a, 3b and 3c schematically illustrate details in relation to performing a third example of the method according to the described examples.

Provision is made here in FIG. 1 for the selection module 4 to be moved relative to the image 2 in rows, wherein in each case only one row of the image 2 is captured by the selection module 4. On the other hand, FIG. 2 shows that the selection module 2 is moved, that is to say displaced, at an angle, for example an acute angle, to an outer edge of the image 2 or to rows of the image 2, and in the process for example also rotated. In an example, different patterns 8a, 8b, 8c in which the selection module 4 is moved relative to the image 2 may also be taken into consideration. In this case, a first such pattern 8a is illustrated in FIG. 3a, wherein this pattern 8a is of elliptical design. In this case, the selection module 4 is rotated elliptically, for example circularly, relative to the image 2. As shown by a second pattern 8b from FIG. 3b, it is also possible to move, here to displace, the selection module 4 in just one direction relative to the image 2. A third pattern 8c, illustrated schematically in FIG. 3c, has two arrows that are parallel to one another and oriented opposite to one another. In this case, the selection module 4 is moved, for example displaced, back and forth relative to the image 2. It is furthermore possible to move the selection module 4 relative to the image 2 in different directions and at different angles. It is also possible here to move the selection module 4 relative to the image 2 at different speeds, wherein it is possible inter alia to change or to vary a respective speed currently and/or dynamically, wherein this speed is adapted for example to a rhythm and/or a tempo of a temporal sequence of the sounds. It is furthermore possible, when moving the selection module 4 relative to the image 2, to read in or scan in different sections or excerpts of the image 2 at different frequencies.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide v. DIRECTV*, 358 F3d 870, 69 USPQ2d 1865 (Fed. Cir. 2004).

REFERENCE SIGNS 2 image
4 selection module
6 lighting module
8a, 8b, 8c pattern
10 sound system
12 data processing unit

The invention claimed is:

1. A method, comprising:
adapting lighting of at least one lighting module of a motor vehicle to sounds generated and output by a sound system of the motor vehicle,
the sounds being associated with at least one image depicted automatically at least in a section of the at least one image by the at least one lighting module and in a manner temporally correlated with the sounds,
the section of the at least one image being selectable by a selection module to be read,
the section depicted being a selected linear and/or slit-shaped section of the at least one image.

2. The method as claimed in claim 1, wherein the at least one image is depicted dynamically by the at least one lighting module based on at least one acoustic parameter of the sounds.

3. The method as claimed in claim 2, wherein the at least one image is depicted on a sleeve for an audio medium that comprises the sounds, and/or the at least one image is associated with an audio source that comprises the sounds.

4. The method as claimed in claim 2, in which the sounds comprise music, voices and/or noise.

5. The method as claimed in claim 1, wherein the at least one image is depicted on a sleeve for an audio medium that comprises the sounds, and/or the at least one image is associated with an audio source that comprises the sounds.

6. The method as claimed in claim 5, in which the sounds comprise music, voices and/or noise.

7. The method as claimed in claim 1, in which the sounds comprise music, voices and/or noise.

8. A system to adapt lighting of at least one lighting module of a motor vehicle, comprising:
a sound system to generate and output sounds which are associable with at least one image;
a selection module; and
a computer processor to automatically trigger at least a sectional depiction of the at least one image by the at least one lighting module in a manner temporally correlated with the sounds,
the selection module to select and read a section of the at least one image, so that a selected linear and/or slit-shaped section of the at least one image is depicted.

9. The system as claimed in claim 8, in which the computer processor is to adopt and/or to scan the at least one image from a database to associate with the sounds.

10. The system as claimed in claim 8, wherein the at least one lighting module is a display and/or as passenger compartment lighting of the motor vehicle.

11. The system as claimed in claim 8, in which the at least one lighting module has a linear configuration.

12. The system as claimed in claim 8, wherein the at least one image is depicted dynamically by the at least one lighting module based on at least one acoustic parameter of the sounds.

13. The system as claimed in claim 12, wherein the at least one image is depicted on a sleeve for an audio medium that comprises the sounds, and/or the at least one image is associated with an audio source that comprises the sounds.

14. The system as claimed in claim 8, wherein the at least one image is depicted on a sleeve for an audio medium that comprises the sounds, and/or the at least one image is associated with an audio source that comprises the sounds.

15. The system as claimed in claim 12, in which the sounds comprise music, voices and/or noise.

16. The system as claimed in claim 14, in which the sounds comprise music, voices and/or noise.

17. The system as claimed in claim 8, in which the sounds comprise music, voices and/or noise.

* * * * *